H. E. PENWELL.
TIRE STRUCTURE.
APPLICATION FILED JUNE 9, 1920.
1,384,484.
Patented July 12, 1921.
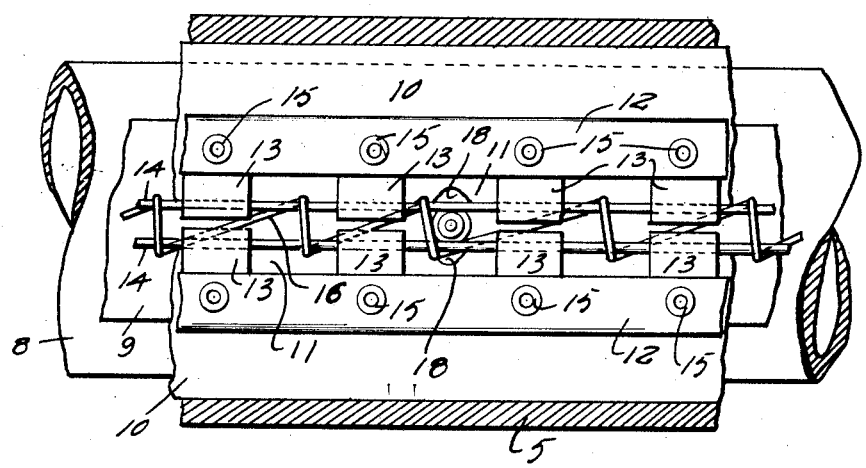
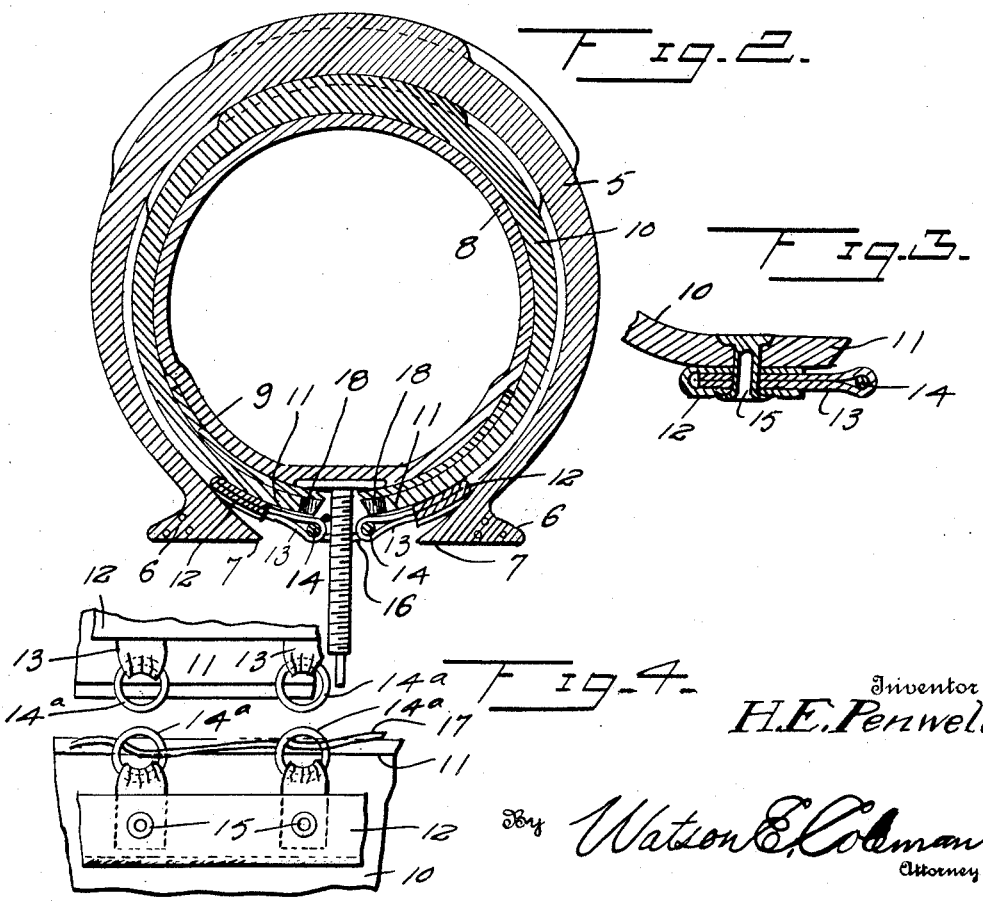
Inventor
H. E. Penwell
By Watson E. Coleman
Attorney

UNITED STATES PATENT OFFICE.

HARRY ELWOOD PENWELL, OF TURLOCK, CALIFORNIA.

TIRE STRUCTURE.

1,384,484.  Specification of Letters Patent.  Patented July 12, 1921.

Application filed June 9, 1920. Serial No. 387,566.

*To all whom it may concern:*

Be it known that I, HARRY ELWOOD PENWELL, a citizen of the United States, residing at Turlock, in the county of Stanislaus and State of California, have invented certain new and useful Improvements in Tire Structures, of which the following is a specification, reference being had to the accompanying drawings.

This invention relates to tire structure, and particularly to a protector and liner for the tire casing.

An object of the invention is to provide a structure of this character which permits the use of an old tire within a new casing to lengthen the life of the tire structure.

Another object is to provide a tire structure of this character wherein a tire similar in construction to the tire casing may be inclosed within the tire casing in engagement with the inner tube, the inner tire casing having its rim engaging beads removed and laced into engagement with the inner tube.

A still further object is to provide a tire structure including an inner casing or liner having novel lace engaging means secured to the separable edges of the liner, said means extending parallel to said edges.

With these and other objects in view, the invention consists in the improved construction and arrangement of parts, to be hereinafter more particularly described in the claim and illustrated in the accompanying drawings, in which:—

Figure 1 is a perspective view, partly in section showing the position of the lace engaging member, Fig. 2 is a transverse sectional view, Fig. 3 is a fragmentary sectional view of the inner casing showing the manner of securing the lace engaging means to the casing, and Fig. 4 is a fragmentary plan view of a modified form of the lace engaging means.

Referring to the drawings, 5 designates an outer tire casing including the usual rim engaging beads 6 and separable edges 7. In the conventional structure of tire, an inner tube 8 is disposed within the outer casing 5, the inner tube having the usual protecting shield 9. With the old conventional form of tire structure, regardless of expert workmanship of the tire casing, the inner tube is not protected to the fullest extent possible and consequently is easily punctured and worn.

In order to lengthen the life of the inner tube, especially where subjected to rough usage, an inner liner or casing 10 is provided, and consists of a structure similar in size and design to the outer casing 5, with the exception that the rim engaging beads are removed, so as to permit the separable edges 11 thereof, to be disposed closely adjacent each other and eliminate projections. This inner casing is disposed between the outer casing and the inner tube. In this way, the inner tube receives double protection, not only at its tread portion but its side portions. Furthermore, a tack, or like sharp instrument, and even a nail can be forced through the tire casing and inner tire casing without danger of same reaching the inner tube. In addition to this, the tread of the inner tire casing includes the same anti-slipping means possessed by the tread of the outer tire casing so that the inner tire casing will not slide or cause friction within the outer tire casing.

The inner tire casing is firmly secured around the inner tube 7 by lacing means, comprising a reinforcing strip of fabric 12 which is folded upon itself laterally. A plurality of loop members 13 are disposed between the folds of the strips 12, in spaced relation to each other and are intended to receive and hold a metal lace engaging member 14, preferably of wire. Each of the separable edges 11 are provided with one of the strips 12, rivets 15 being passed through the reinforcing member, loops 13 and tire casing 8 to secure said strips to the casing. It will be noted that the metal lace engaging member 14, coincides with the marginal edge of the separable edges 11 so as to permit said edges to be drawn closely adjacent each other over the inner tubes. A lace 16 is intended to be passed around the metal lace engaging members 14, between the loops 13, to draw said members toward each other in the lacing operation. To prevent the valve casing of the inner tube from interfering with the lacing operation of the lace engaging members 14, notches 18 are formed in the separable edges, the notches registering with each other so as to provide an opening through which the valve casing of inner tube extends.

In Fig. 4, a modified form of lace engaging means is shown, and consists of a plurality of rings 14ª which are disposed in each of the loop members 13 and are intended to receive the lace 17. The loops on one of the separable edges 11 are disposed in diametrically spaced relation to the loops carried by the opposite edge 11.

In view of the novel lace engaging member 14, it is possible to lace the inner casing 10 so as to eliminate friction on the inner tube by said separable edges. Another important feature of this invention is that, if desired, a new tire may be used as an inner casing by removing the rim engaging beads. At the same time, the invention provides a new use for an old or discarded tire. The tire need not be of any particular construction. It can be utilized so long as it is of the same size as the outer casing and as it is firmly laced to the inner tube and snugly positioned within the outer casing, all form of friction is eliminated and the life of the entire tire structure lengthened.

What is claimed is:—

A tire structure of the character described comprising a tire casing including separable edges, a laminated reinforcing strip secured to each of said edges, the longitudinal edges of said laminations coinciding, loop members disposed between the laminations of said strips, a wire extending longitudinally of each of said separable edges through the loop members, and a lace adapted to alternately engage said wire between the loop members to draw said separable edges closely adjacent each other.

In testimony whereof I hereunto affix my signature.

HARRY ELWOOD PENWELL.